United States Patent [19]

Krall et al.

[11] 4,070,428

[45] Jan. 24, 1978

[54] METHOD FOR BLOW MOLDING

[75] Inventors: Thomas J. Krall; Albert R. Uhlig, both of Toledo, Ohio

[73] Assignee: Owens-Illinois, Inc., Toledo, Ohio

[21] Appl. No.: 656,566

[22] Filed: Feb. 9, 1976

[51] Int. Cl.² .......................................... B29C 17/07
[52] U.S. Cl. ........................................ 264/89; 264/98; 425/530; 425/534
[58] Field of Search ..................... 264/89, 94, 98, 99; 425/DIG. 208, DIG. 213, DIG. 215, DIG. 211

[56] References Cited

U.S. PATENT DOCUMENTS

| | | | |
|---|---|---|---|
| 2,792,593 | 5/1957 | Hardgrove, Jr. | 425/DIG. 208 |
| 3,125,619 | 3/1964 | Miller | 264/98 |
| 3,324,507 | 6/1967 | Arlo | 425/DIG. 208 |
| 3,325,862 | 6/1967 | Mehnert | 264/98 X |
| 3,415,915 | 12/1968 | Lecluyse et al. | 425/DIG. 211 |
| 3,632,261 | 1/1972 | Gasior et al. | 425/387 B X |
| 3,767,747 | 10/1973 | Uhlig | 264/89 |
| 3,873,660 | 3/1975 | Reilly et al. | 264/89 |
| 3,940,231 | 2/1976 | Uhlig | 425/DIG. 208 X |
| 3,978,184 | 8/1976 | Dybala et al. | 425/DIG. 213 |

Primary Examiner—Jan H. Silbaugh
Attorney, Agent, or Firm—Richard D. Heberling

[57] ABSTRACT

A method utilizing preform and final blow molds for forming molecularly oriented thermoplastic articles. According to the method, an extruded tubular parison is positioned within the pre-form blow mold and blown to a pre-form configuration. The blown pre-form is then conveyed, while suspended from a moveable carrier, through a thermal conditioning chamber and the temperature of the pre-form is adjusted to within the range for molecular orientation. Next, the thermally conditioned pre-form is conveyed by the moveable carrier to a final blowing station where the pre-form is blown to the configuration of the final article. In a first disclosed embodiment, the carrier is a blow pin which is inserted into the tubular parison at the pre-form molding station prior to the first molding operation. In the second embodiment, the carrier is a tubular projection telescopically inserted into the blown pre-form prior to entry of the pre-form into the thermal conditioning chamber, and the pre-form is blown to its final shape by a blow tube inserted through the carrier. In both embodiments, the carriers are used to convey successive pre-forms in a continuous molding operation.

2 Claims, 17 Drawing Figures

METHOD FOR BLOW MOLDING

BACKGROUND OF THE INVENTION

1. Field of the Invention

The present invention relates to a method for forming oriented thermoplastic articles, and more particularly to a method and apparatus utilizing moveable blow pins for transporting blown pre-forms through a thermal conditioning region prior to the final blowing operation.

2. The Prior Art

In the art of blow molding thermoplastic articles, the so-called "blow and blow" technique has become widely used for molecular orientation. In such operations, a blowable plastic parison is positioned within a first mold cavity and blown to a pre-form configuration. Next, the pre-form is positioned within a second mold cavity, where it is blown to a configuration of the final container. This general overall process has undergone several refinements, including a sequential blow, stretch, and blow technique as disclosed in U.S. Pat. No. 3,781,395, which is incorporated by reference.

Even though the overall operation of U.S. Pat. No. 3,781,395 advanced the art of molecular orientation, this patent does not disclose a thermal conditioning means between the pre-form mold and final blow mold. Thus, the blown pre-form must be maintained in the pre-form mold for a sufficient period of time to bring the plastic material temperature to within the range for molecular orientation. Depending upon the material being used, an unnecessarily long dwell time may be required for the pre-form in the first mold cavity, thereby prolonging the overall "blow and blow" operation cycle.

U.S. Pat. No. 3,873,660, which is also incorporated by reference, proposes that the temperature of a blown pre-form be adjusted within a thermal conditioning chamber between the pre-form molding station and the final molding station. The apparatus disclosed in this patent, however, requires pre-form handling and trimming mechanism which can adversely affect the temperature for optimum molecular orientation.

Applicants here propose to overcome these disadvantages in the prior art by the use of a plurality of moveable blow pins from which the blow preforms suspend while in a thermal conditioning chamber in transit to the final blow molding station. Although moveable blow pins, per se, are disclosed in U.S. Pat. No. 3,599,280, and pre-form conveying systems are disclosed in U.S. Pat. No. 3,324,507, these patents do not provide the overall advantages, method, or apparatus of the present invention.

SUMMARY OF THE INVENTION

The present invention provides a method for blowing a plastic parison into a pre-form, thermally conditioning the pre-form to a temperature conducive to molecular orientation, and then blowing the thermally conditioned pre-form to a final article. The method utilizes the pre-forming step to thermally pre-condition the plastic material by direct mold contact prior to a secondary thermal conditioning step within a separate thermal region.

In a first proposed embodiment, a plurality of independently moveable blow pins are utilized for transporting the blown pre-forms from a pre-form molding station to the final molding station, the blow pins being connected to individual carrier plates that are slideable along guide rails. These independently moveable blow pins are inserted into an open end portion of a mold-enclosed parison at the pre-form molding station. Air under pressure is supplied through the blow pin to inflate the parison to a pre-form configuration. After the molding operation, the pre-form mold sections are opened, leaving the blown pre-form pendently suspended from the moveable blow pin, which is then indexed into a thermal conditioning chamber.

In accordance with the invention, the thermal conditioning chamber adjusts the temperature of the pre-form to within a range conducive to substantial molecular orientation in a final molding operation. After the proper thermal treatment, the moveable blow pins with suspended pre-forms are then moved to a final molding station where the pre-form is blown to the final article and the plastic material is molecularly oriented.

In the apparatus of this first embodiment, the pre-form mold, thermal conditioning chamber, and final blow mold are arranged on one general horizontal level and the moveable blow pins are moved from the pre-form blowing station to the final blowing station along a set of guide rails. After the blow pins are used in the final blowing operation, they are lifted to a position above the final blow mold and then intermittently moved back to a position generally above the pre-form mold. When positioned above the pre-form mold, the blow pin carrier plates are inserted within a descent yoke and lowered to insert the blow pins in an open ended portion of a mold-enclosed parison.

In a second embodiment, the moveable carriers, or blow pins, are attached to a chain-type system which progressively and intermittently moves the blow pins through a thermal conditioning chamber to a final blow molding station. In this embodiment, a separate blow nozzle is used at the pre-form molding station for inflating the parison to a pre-form configuration. A set of bracket arms are attached to the pre-form molds for transporting the blown pre-form from the blowing nozzle to the moveable blow pins. These bracket arms include vertically reciprocal members which grasp the outer surface of the blown pre-form neck for telescopically inserting the pre-form neck over the moveable blow pins. Then, the bracket arms release the pre-form necks, leaving the pre-form pendently suspended from the moveable blow pins for displacement through the thermal conditioning means to the final blowing station.

Various alternative structures are also disclosed for use with either of the two primary overall embodiments. First, means are disclosed for rotating the blow pins while in the thermal conditioning chamber to achieve a more uniform peripheral pre-form temperature. Second, a replaceable blow pin is disclosed, as being releaseably maintained in a blow pin carrier by a snap-fit arrangement. Third, means are disclosed for stretching the blown pre-form prior to the final blowing operation.

It is therefore an object of the present invention to provide a method for continuously manufacturing blown plastic articles, for reducing overall operational cycle time and for reducing apparatus components.

A further object of the invention is to provide a molding method capable of accurately adjusting the temperature of a pre-form to within the range for substantial molecular orientation during a final blowing operation.

Still another object is to provide a method capable of rapidly quenching plastic material from melt temperature during a pre-form molding operation to create shape stability and to control crystalline structure.

Other objects of this invention will appear from the following description and claims.

DETAILED DESCRIPTION OF THE PREFERRED EMBODIMENTS

Figure 1:
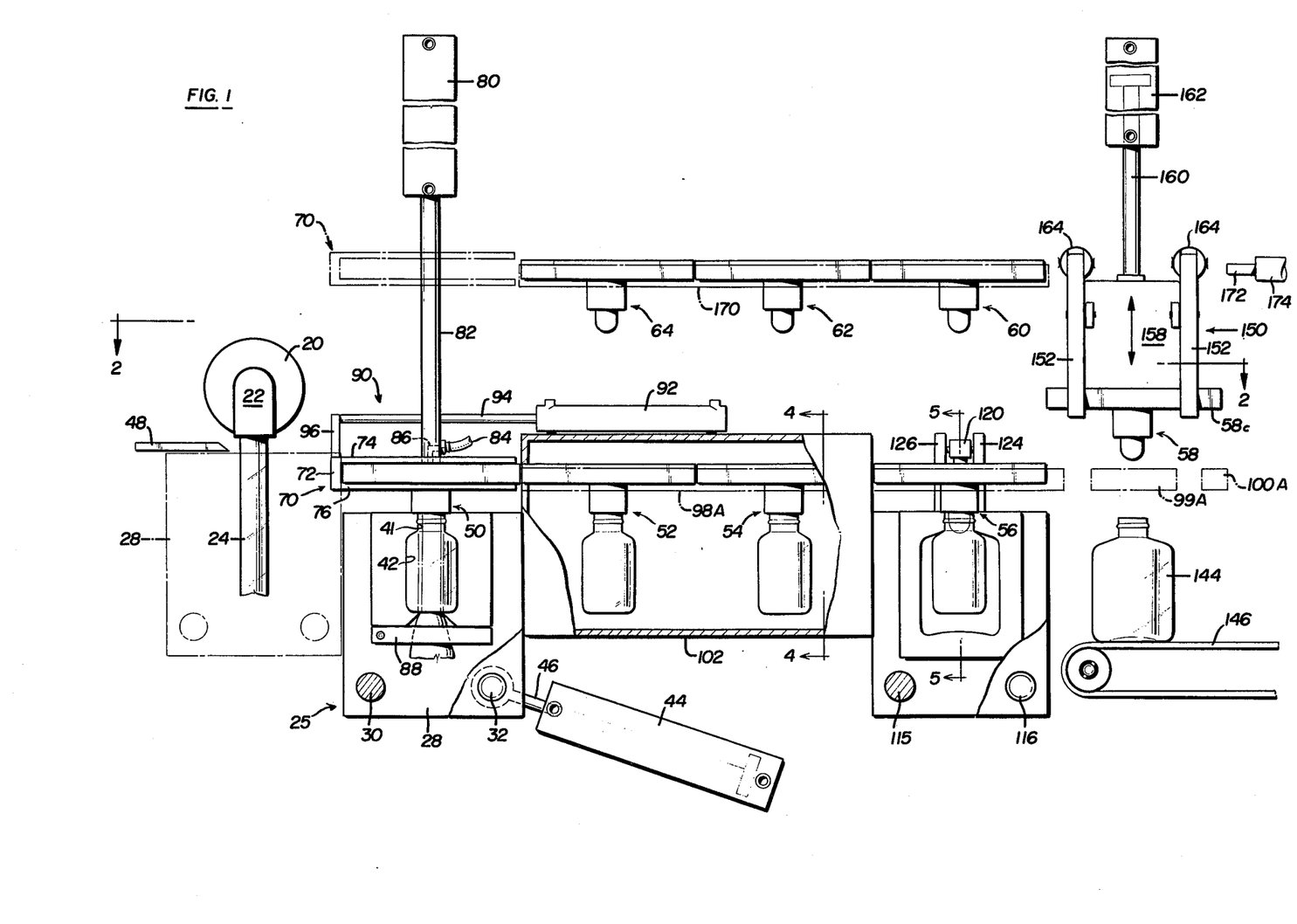
FIG. 1 is a schematic elevational view of one embodiment proposed by the present invention for thermally conditioning a blown pre-form while suspended on a moveable blow pin.
Figures 2, 3:
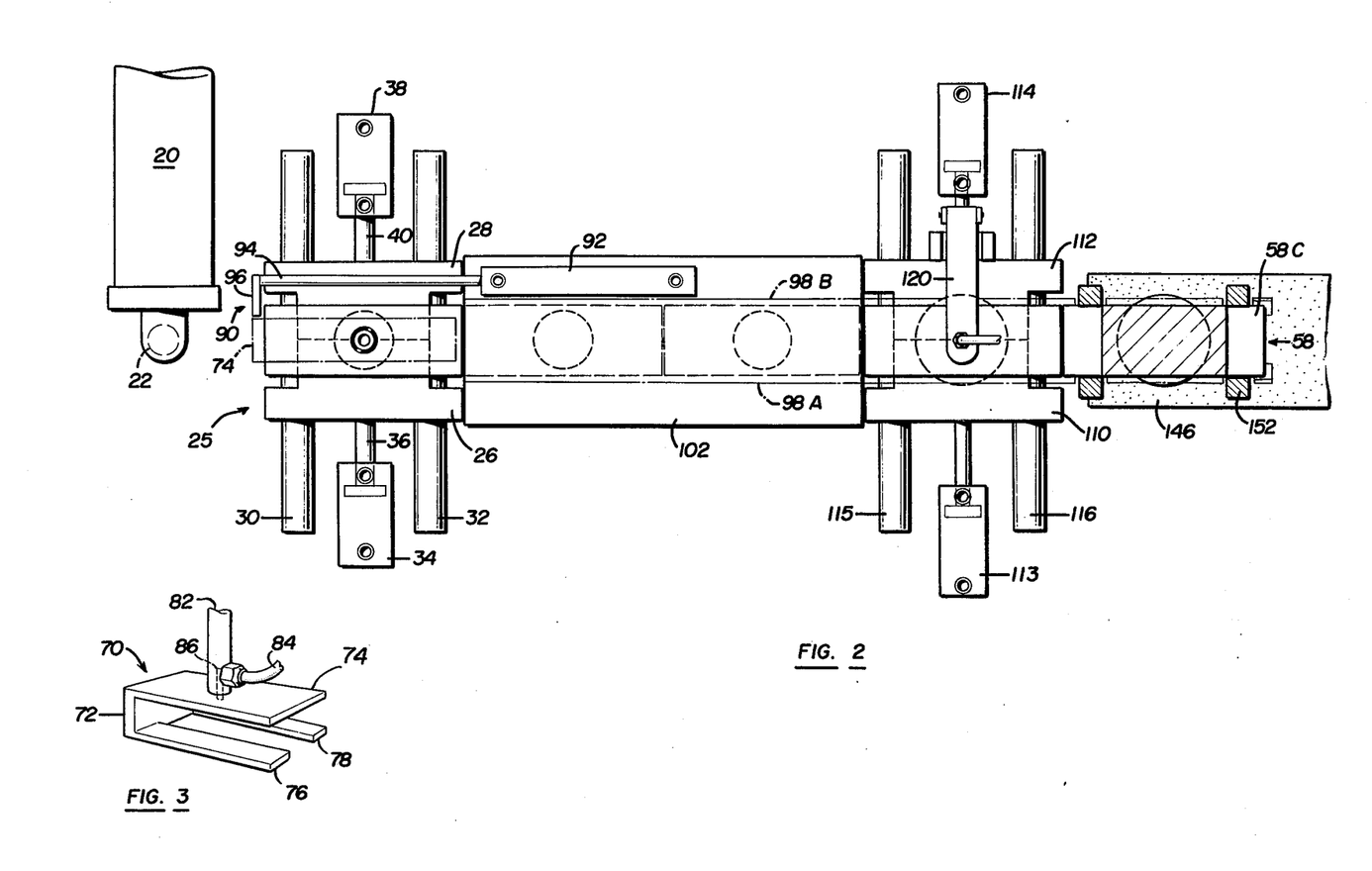
FIG. 2 is a top plan view taken along plane 2—2 as indicated in FIG. 1.
FIG. 3 is a perspective view of the blow pin carrier descent yoke utilized in the embodiment of FIG. 1.

The overall method and apparatus of this disclosure relates to forming a plastic parison, blowing the plastic parison to a pre-form configuration in a first mold cavity, thermally conditioning the blown pre-form while suspended from a moveable blow pin, and then blowing the thermally conditioned pre-form within a final blow mold. Referring to the drawings, and in particular FIGS. 1 and 2, a first embodiment is illustrated for carrying out this overall process.

Reference numeral 20 indicates an extruder which includes a downwardly directed annular orifice structure 22 from which a generally tubular thermoplastic parison 24 issues, either continuously or intermittently as is well known in the art.

A pre-form mold 25 includes mold sections 26 and 28 which are mounted on tie rods 30 and 32 for transverse sliding movement relative to one another by hydraulic cylinders and pistons 34, 36, 38, and 40, respectively. When closed, as shown in FIG. 2, the pre-from mold sections define a neck or finish region 41 and a pre-form cavity 42 against which the parison is expanded to form a blown pre-form.

FIG. 1 also illustrates an inclined actuating cylinder 44 having a piston rod 46 that is secured to tie rod 32 for moving the pre-form molding assembly 25 from the pre-form mold position illustrated in FIGS. 1 and 2 to a position illustrated in phantom in FIG. 1 for receiving a tubular parison 24.

The sequence of operation for positioning a tubular parison within a pre-form cavity 42 at the pre-form molding station is as follows. First, hydraulic cylinders 34 and 38 are actuated to retract piston rods 36 and 40 to thereby open the pre-form mold sections 26 and 28. Next, hydraulic cylinder 44 is actuated to extend piston rod 46 and position the opened pre-form mold sections on each side of the extruded tubular parison 24. The pre-form mold sections 26 and 28 are then closed by hydraulic cylinders 34 and 38 to pinch the parison shut at its bottom end. A conventional blade 48 then severs the mold enclosed parison portion from that portion of the parison which is issuing from the extruder nozzle 22, thereby forming an open-ended parison portion to receive a blow pin at the pre-form molding station. Piston rod 46 is then retracted and moves the closed pre-form mold sections 26 and 28 to the position shown in FIGS. 1 and 2.

In accordance with the embodiment of FIG. 1, a plurality of independently moveable blow pins, or carriers, 50, 52, 54, 56, 58, 60, 62 and 64 are provided for successive insertion into the severed, opened ends of blowable plastic parisons enclosed in the pre-form mold 25. As illustrated, blow pin 50 is supported within a descent yoke 70 at the pre-form molding station; blow pins 52 and 54 are supported on guide rail sections 98A and 98B in a thermal conditioning chamber 102; blow pin 56 is supported on guide rail sections at the final blowing station; blow pin 58 is supported within a lift mechanism 150; and blow pins 60, 62 and 64 are supported on guide rails sections 170, prior to placement within the descent yoke assembly 70 for insertion within a blowable parison at the pre-form molding station.

Figure 4:
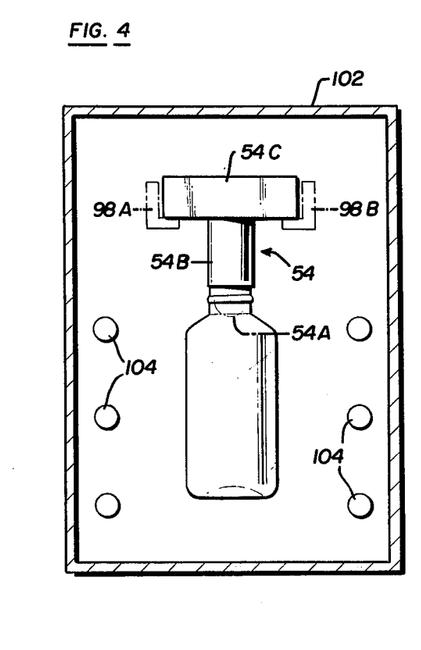
FIG. 4 is a schematic cross-sectional view taken along plane 4—4 as indicated in FIG. 1, illustrating the thermal conditioning chamber with a pre-form suspended from a moveable blow pin.
Figure 5:
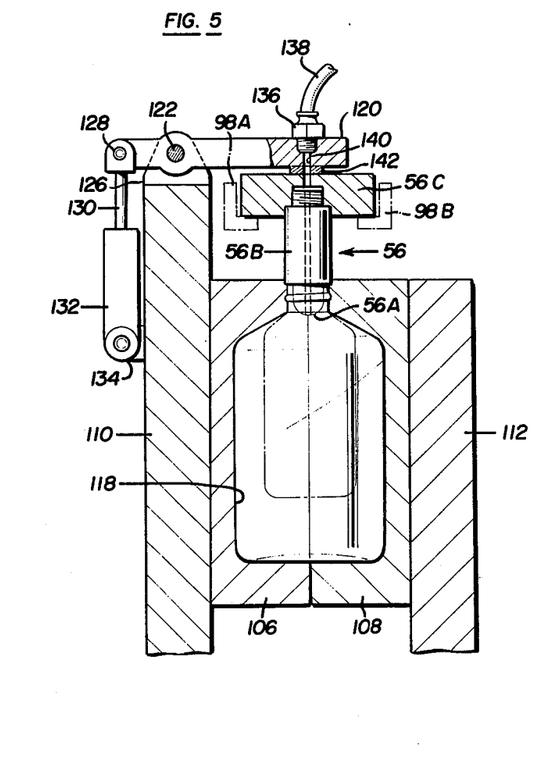
FIG. 5 is a schematic cross-sectional view taken along plane 5—5 as indicated in FIG. 1, illustrating the final blow mold station.

As best illustrated in FIGS. 4 and 5, each blow pin includes a downwardly directed, dome-shaped terminal nose portion A, for example 54A and 56A, which is dimensioned to fit within the open end portion of a parison, so that the pre-form can be suspended therefrom. An enlarged cylindrical shaft portion B, for example 54B and 56B, surmounts the blow pin nose and is threadedly received in a blow pin carrier plate C, for example 54C and 56C. A bore extends through each blow pin carrier plate and blow pin shaft and nose, as illustrated in FIG. 5, to supply blow air into the parisons and pre-forms during the molding operations.

As illustrated in FIG. 1, blow pin carrier plate 50C is supported within the yoke descent assembly 70, with the blow pin nose 50A inserted within the open-ended neck portion of a mold enclosed parison. The yoke assembly 70 is illustrated in the perspective view of FIG. 3 and includes a vertical abutment plate 72, a top horizontal pressure plate 74, and two parallel support arms 76 and 78 extending from the vertical abutment plate 72. Thus, the blow pin carrier plate C fits between top pressure plate 74 and rests upon the two horizontal support arms 76 and 78, with the blow pin extending downwardly between the slot between the two horizontal support arms.

The descent yoke assembly is raised and lowered by a hydraulic cylinder 80 and piston rod 82, which is rigidly connected at its lower end to the top horizontal pressure plate 74. Prior to placement within the descent yoke assembly 70, blow pin 50 was supported on guide rail sections 170 at the position where blow pin 64 is illustrated in FIG. 1. The descent yoke assembly was raised to the position as illustrated in phantom in FIG. 1, and blow pin 50 was pushed horizontally into the descent yoke assembly as will be more fully explained below.

With the blow pin 50 and descent yoke assembly positioned as illustrated in FIG. 1, the mold-enclosed parison is blown to the pre-form configuration by injecting air under pressure through a blow line 84, into a bore 86 which extends through piston rod 82 and top pressure plate 74, and then through the bore of the blow pin. The preform may be removed from the preform mold prior to being cooled to room temperature, thus serving (a) to reduce the energy required for reheating to orientation temperature and (b) to reduce the time required within the next adjacent thermal conditioning chamber. After the pre-form has been blown, conventional tail pullers 88 are actuated to remove excess plastic material depending from the pre-form mold cavity.

An indexing mechanism 90 is provided for displacing blow pin 50 from within the descent yoke 70 after the formation of the pre-form and after the pre-form mold sections have been opened. The indexing mechanism includes a hydraulic cylinder 92, a piston rod 94, and a pull plate 96, the hydraulic cylinder 92 being secured to the top of thermal conditioning chamber 102 by suitable means. As illustrated in FIG. 2, pull plate 96 is securely mounted to the end of piston rod 94 and extends laterally therefrom for alignment with at least a portion of the blow pin carrier plate. Thus, to move blow pin 50 from descent yoke 70, piston rod 94 is retracted and pull arm 96 displaces blow pin 50 to the position previously occupied by blow pin 52. Blow pin 50 in turn pushes blow pin 52 to the position previously occupied by blow pin 54 and so on, so that blow pin 56 is pushed to a position beneath lift assembly 150 as supported partially on guide rails sections 98, 99, and 100. As illustrated in FIGS. 4 and 5, the guide rails sections are comprised of sets of L-shaped members, for example, 98A and 98B. Guide rail sections 98, 99 and 100 are longitudinally spaced to provide clearance for components of the lift assembly 150, as will be explained in greater detail below.

Reference numeral 102 indicates a thermal conditioning chamber which has a dual purpose in the present invention. First, the chamber reduces the cure time for the blown pre-form within the pre-form mold and therefore reduces the overall cycle time for the "blow and blow" process. Second, the thermal conditioning chamber provides the ability to very accurately adjust the temperature of the preforms to within the optimum range for the most effective molecular orientation of plastic material in the final blowing operation. As illustrated in the drawings, the pre-forms are pendently suspended from the moveable blow pins while in the thermal conditioning chamber so that the body of the pre-forms are not in communication with other transporting members which could conduct heat and therefore adversely affect the pre-form thermal condition. It should be noted also that no additional handling means are necessary for transporting the thermally conditioned pre-forms from chamber 102 to the final blowing station. That is, the thermally conditioned pre-forms remain in a suspended position from the moveable blow pins for placement in the final blowing position.

To achieve proper pre-form temperature, a variety of thermal conditioning sources may be utilized, depending upon the particular material being used. For example, FIG. 4 illustrates a plurality of heating coils or rods 104 for supplying heat to the thermal conditioning chamber. These heating rods could be replaced with hot air sources, or even alternatively cool air sources. Specifically, heating sources may be utilized when the blown pre-form is maintained in the pre-form mold for a significant period of time and becomes cooled, for example, for transfer stability. In this instance, the pre-form would be re-heated to a temperature conducive to a optimum molecular orientation. As is known in the art, the most preferable orientation temperature is just above the glass transition temperature point for the particular plastic material being used.

In certain instances, the thermal conditioning chamber may include cool air sources. For example, when thick, heavy weight polyethylene material is used to form bottles, the curing time in the pre-form mold may not cool the material to the optimum temperature for substantial molecular orientation.

In other situations, it may be desirable to adjust different portions of the pre-form to differing temperatures, so-called differential temperature adjustment. For example, the heel sections of a blown pre-form may be adjusted to a temperature cooler than the remaining portions of the pre-form, since it is known that cool sections expand to a less extent during final blowing. Therefore, cool air sources could be positioned in the bottom portion of the thermal conditioning chamber with warmer air sources being provided for the blown body portion of the pre-form. Further, as will be discussed in regard to FIGS. 7 and 8, it may be desirable to rotate the blown pre-form while in the thermal conditioning chamber to achieve a more uniform temperature distribution around the entire pre-form periphery.

Turning now more specifically to FIG. 5, the final blow mold is illustrated as including a pair of sectional mold halves 106 and 108 which are securely mounted on platens 110 and 112 in any conventional manner. The platens 110 and 112 are slideably transversely toward and away from one another by power means 113 and 114 (FIG. 2) along tie rods 115 and 116. When closed, the blow mold sections 106 and 108 define a final blow mold cavity 118 which surrounds the pendently supported, thermally conditioned pre-form. From FIG. 5, it should be noted that the final blow mold sections 106 and 108 initially contact the pre-form substantially only at the previously formed pre-form neck portion, thus maintaining the desired pre-form orientation temperature for the body of the pre-form until the final blowing operation.

The means for supplying blow air to the pre-form for the final blowing operation comprises an arm 120 which is pivotally mounted on a hinge pin 122 that extends between upstanding arms 124 and 126 on platen 110. One end of the arm 120 is pivotally connected by a pin 128 to a piston rod 130 of a hydraulic cylinder arrangement 132 that is suitably mounted by a bracket 134 to platen 110. A coupling 136 is threadedly secured within the other end portion of pivotal arm 120 and establishes fluid communication between an air supply line 138 and a bore 140 for accommodating the supply of blow air through the bore in the blow pin for blowing the pre-form to the configuration of the final article. As illustrated, a suitable gasket 142 may be secured to the bottom surface of pivotal arm 120 in alignment with bore 140 so that a fluid-tight connection will be achieved between the pivotal arm 120 and the blow pin carrier plate 56C.

The operational sequence at the final blowing station is as follows. After the pre-form has been blown to the final blown article, during which blowing operation substantial molecular orientation is accomplished because the pre-form is at a temperature conducive to orientation, piston rod 130 is retracted to pivot arm 120 about hinge pin 122, thus lifting gasket 142 away from the top surface of blow pin carrier plate 56C. Next, hydraulic power sources 113 and 114 are actuated to displace platens 110 and 112 away from each other, leaving the blown final article pendently suspended from blow pin 56. When the indexing mechanism 90 is actuated to pull blow pin 50 from the pre-form molding station to a position within the thermal conditioning chamber, blow pin 56 is in turn pushed to a position beneath a lift mechanism 150 and blow pin 54 with a thermally conditioned pre-form is pushed to a position between the opened mold sections 106 and 108. Next, the hydraulic sources 113 and 114 are actuated to displace plates 110 and 112 along tie rods 115 and 116, thereby enclosing the pre-form on blow pin 54 within mold cavity 118. Piston rod 130 is then extended to the position shown in FIG. 5 so that communication is established between air supply bore 140 and the bore extending through blow pin 54. A suitable valving mechanism (not shown) then supplies blow air through supply line 138, and another blown article is formed.

While blow pin 56 is positioned at the final blowing station, blow pin 58 is supported with a suspended final article 144 on guide rail sections 98, 99 and 100. At this position, the final blown article is ejected from the blow pin by any suitable means for position on a conveyor belt 146.

Figure 6:
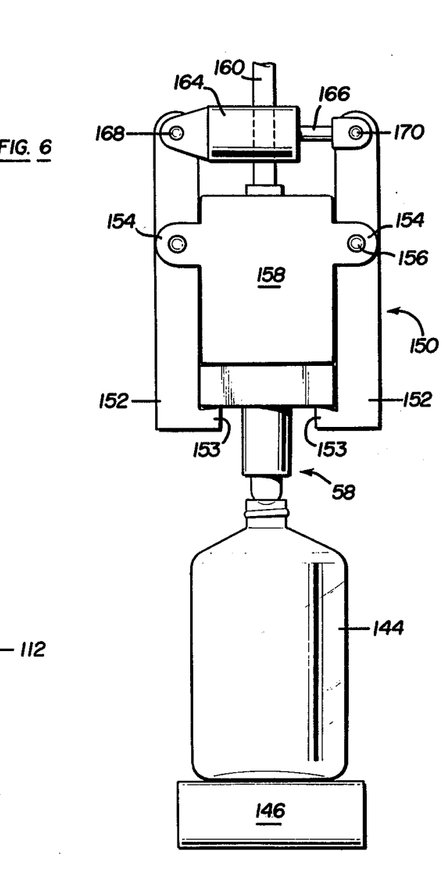
FIG. 6 is a schematic elevational view illustrating the parison ejection station and blow pin carrier lift mechanism.

As illustrated in FIG. 1, ejection of article 144 has been accomplished and blow pin 58 is supported within a lift mechanism 150. As illustrated in FIGS. 1 and 6, the lift mechanism includes four lift arms 152 having inwardly directed flanges 153 for supporting and lifting the blow pin carrier plates. The lift arms 152 are each pivotally mounted to tab members 154 by pins 156, the tabs extending from a central lift body 158 which is raised and lowered by a piston rod 160 of a hydraulic cylinder 162. Hydraulic cylinders 164 and piston rods 166 are pivotally mounted at respective ends to each set of lift arms 152 by pins 168 and 170.

As illustrated in FIG. 1, lift mechanism 150 is in the process of raising blow pin 58 from the lower guide rails sections. The ascent of the lifting mechanism will continue until blow pin carrier plate 58C is in horizontal alignment with the blow pin carrier plates of blow pins 60, 62 and 64, as supported on guide rail sections 170 which are similar in shape and configuration with guide rail sections 98, 99 and 100. At this position, blow pin carrier plate 58C will also be in horizontal alignment with a push rod 172, which in essence is a piston rod of a hydraulic cylinder 174. To remove blow pin 58 from the lift assembly 150, push rod 172 is extended to engage the end surface of blow pin carrier plate 58C and then to shove the blow pin onto the guide rail surfaces 170. At this same time, the descent yoke assembly 70 will be positioned as illustrated by the phantom lines in FIG. 1. When blow pin 58 is pushed onto guide rail 170 it will engage blow pin 60 and therefore push blow pins 60, 62 and 64 to the left as viewed in FIG. 1, with blow pin 64 being pushed into the descent yoke assembly 70 for displacement to the pre-form blowing station.

Hydraulic cylinders 164 are then activated to pivot arms 152 outwardly about hinge pins 156. Piston rod 160 is then lowered, and the outwardly pivoted flange surfaces 153 clear a blow pin carrier plate positioned on guide rail surfaces 98, 99, and 100. When the lift mechanism 150 is positioned in its lowermost descent, pivot arms 152 fit between the spaces between guide rail sections 98, 99, and 100. At this position, hydraulic cylinders 164 are activated to inwardly pivot flange support surfaces 153 for engaging the bottom surface of a blow pin carrier plate. Next, hydraulic cylinder 162 is activated and piston rod 162 raises the lift mechanism.

Figure 7:
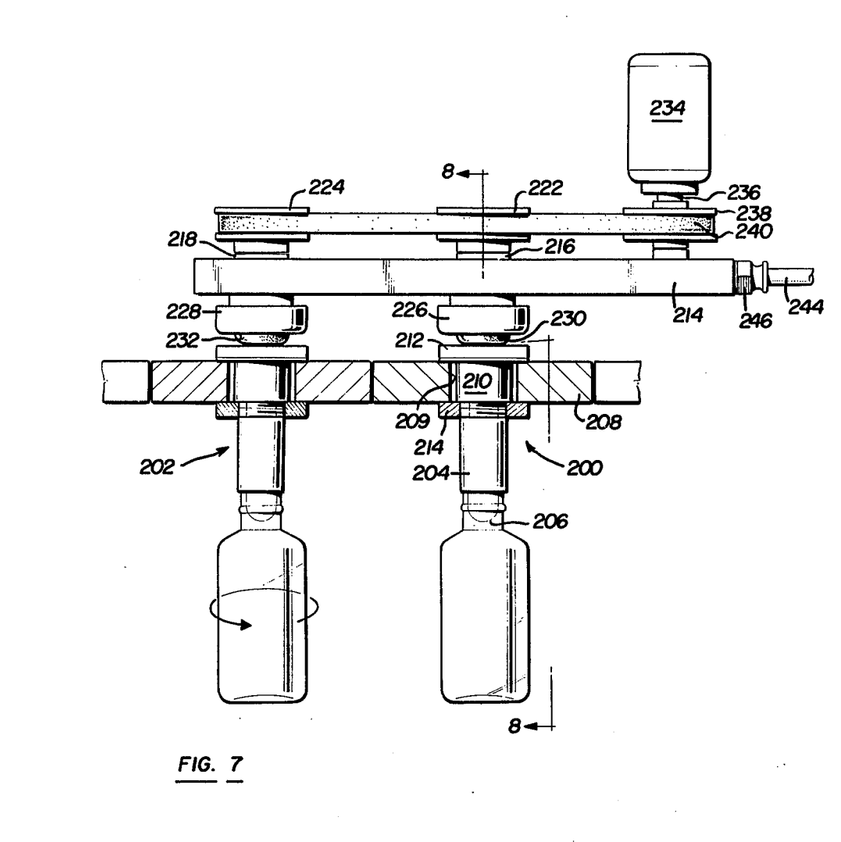
FIG. 7 is a schematic elevational view of an alternative mechanism for spinning the suspended pre-forms while in a thermal conditioning chamber to provide a uniform peripheral pre-form temperature.
Figure 8:
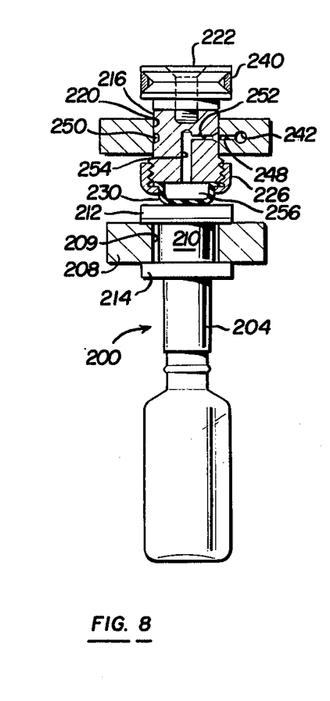
FIG. 8 is a cross-section elevation view taken along plane 8—8 as indicated in FIG. 7.

Turning now to FIGS. 7 and 8, an alternative embodiment is provided for spinning the pendently suspended pre-forms while in the thermal conditioning chamber to achieve a more uniform peripheral temperature. This embodiment is especially useful when heating coils or bands are used, since these elements concentrate their effect on the most adjacent pre-form surface.

For illustrative purposes, two blow pins 200 and 202 are shown, these blow pins being similar to those of FIGS. 1–6 in the sense of having a cylindrical shaft portion 204 surmounting a dome-shaped nose portion 206 for insertion within a parison and pre-form. In this embodiment, however, the blow pin carrier plate 208 includes a circular opening 209 within which a cylindrical, rotatable shaft 210 is maintained. A circular supporting plate 212 is secured to the top of the shaft 210 and rests upon the top surface of the blow pin carrier plate 208. Blow pin shaft 204 is threadedly secured to the bottom portion of shaft 210, with an annular collar 214 fitting on member 204 in close proximity to the lower surface of blow pin carrier plate 208. Thus, the blow pin assembly, including components 204, 206, 210, 212, and 214, are rotatable with respect to the blow pin carrier plates.

The mechanism for rotating the blow pins includes a support ledge 214 having a pair of shafts 216 and 218 rotatably maintained within respective circular openings, one such opening being indicated by reference numeral 220 in FIG. 8. Each rotatable shaft has a respective driven wheel 222, 224 secured to the top thereof, and an annular cap 226, 228 threadedly secured to the bottom thereof. Each annular cap secures an expansible member 230, 232 in position for engaging and imparting rotary motion to the respective circular support plates of the blow pin arrangement.

A rotary drive motor is suitably mounted on ledge 214 and has an output shaft 236 connected to a drive wheel 238. A drive belt 240 fits over drive wheel 238 and imparts rotary motion to driven wheels 222 and 224.

The support ledge 214 also includes a longitudinal bore 242 which is in communication with an air supply line 244 that is connected to the ledge 214 by a threaded coupling 246. Secondary transverse bores 248 extend from the longitudinal bore 242 and communicate with an annular groove 250 in each peripheral surface of rotary shafts 216 and 218. A transverse bore 252 extends radially from the annular groove 250 to communicate with an axial, longitudinal bore 254, thus establishing communication between supply line 244 and a collapsible chamber 256 defined between the lower surface of the rotatable shafts 216, 218 and the expansible members 230 and 232.

As illustrated in FIGS. 7 and 8, air under pressure is being supplied from line 244 to the inflatable, resilient members 230 and 232. Simultaneously, rotary drive motor 234 is imparting rotary motion to rotatable shafts 216 and 218. With the inflatable, resilient pads 230 and 232 being in engagement with the circular supporting plates 212, the blown pre-forms are rotated about their longitudinal axes while suspended from the blow pins.

Just prior to the blow pin carrier plates being indexed to the next position in operational sequence, a negative pressure may be pulled by line 244, thus collapsing the expansible members 230 and 232. When blow pin 202 is indexed to the previous position of blow pin 200, a positive pressure is re-supplied by line 244, thus expanding pad 230 into contact with the circular support plate of blow pin 202 to continue the pre-form spinning operation.

Figure 9:
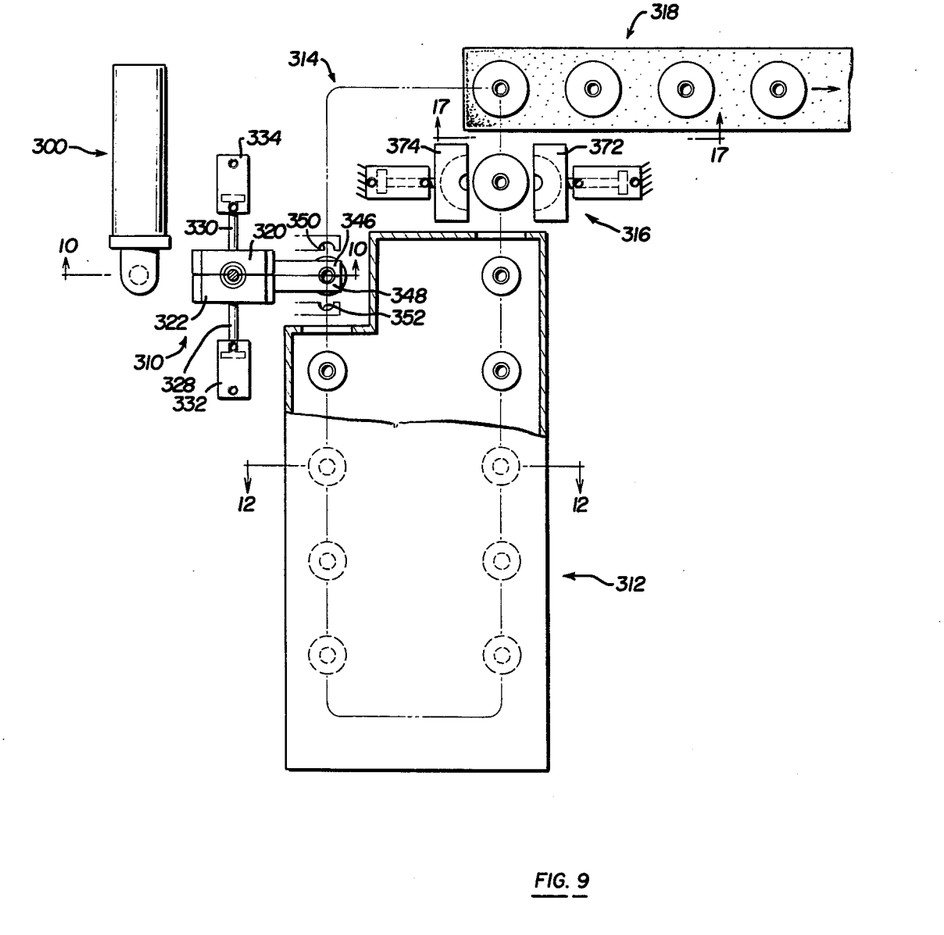
FIG. 9 is a schematic top plan view of a second embodiment for thermally conditioning a blown pre-form as it is suspended from a moveable blow pin.

Turning now to FIGS. 9-17, a second overall embodiment is illustrated for thermally conditioning pendently supported pre-forms to a temperature conducive to substantial molecular orientation. As illustrated in FIG. 9, this embodiment includes an extruder 300, a pre-form mold 310, a thermal conditioning chamber 312, a moveable blow pin conveyor system 314, a final mold assembly 316, and a conveyor system 318. The extruder 300 is conventionally designed and includes a downwardly directed annular orifice structure 302. The thermal conditioning chamber 312 may include heating means, cooling means, or combinations thereof as more fully discussed in relationship to thermal conditioning chamber 102 of FIG. 1. The moveable blow pin conveyor system may be comprised of conventional chain links, to which separate moveable blow pins are connected.

Figure 10:
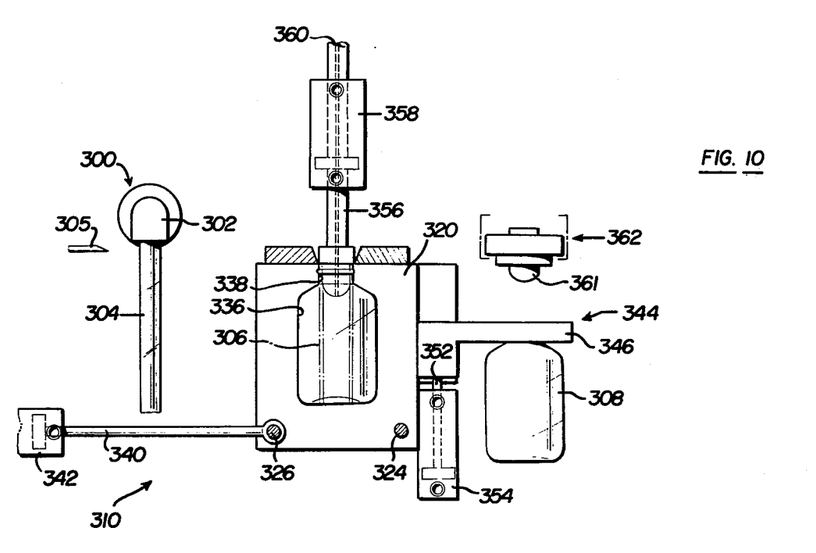
FIG. 10 is a cross-sectional view taken along plane 10—10 as indicated in FIG. 9, illustrating the pre-form mold and pre-form conveyor arm proposed for this embodiment.
Figure 11:
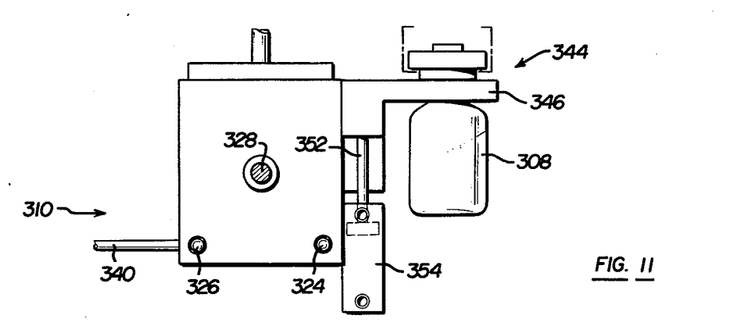
FIG. 11 is a view similar to FIG. 10, illustrating the manner of inserting a blown pre-form onto a moveable blow pin.

As illustrated in FIGS. 9, 10, and 11, the pre-form blow mold assembly 310 includes a pair of blow mold sections 320 and 322 which are moveable transversely toward and away fom one another along tie rods 324 and 326 by piston rods 328 and 330 of hydraulic cylinders 332 and 334. When closed, the blow mold halves 320 and 322 define a pre-form mold cavity 336 and a neck or finished region 338. A piston rod 340 of hydraulic cylinder 342 is connected to tie rod 326 for moving the pre-form mold assembly 310 from the pre-form molding position shown in FIG. 10 to a position beneath extruder 300.

A neck bracket assembly 344 is also connected to the pre-form mold 310 for transporting a blown pre-form from the pre-form molding station for placement on a moveable blow pin. The neck bracket assembly includes bracket arms 346 and 348 slideably connected to respective blow mold halves 320 and 322, the bracket arms having semi-circular recesses 350 and 352 for gripping the neck portion of a blown pre-form. The bracket arms are maintained in suitable guideways, (not shown) and are raised and lowered by respective piston rods 352 of hydraulic cylinders 354.

As illustrated in FIG. 10, a freshly extruded tubular parison 304 depends from extruder nozzle 302, a tubular parison 306 is enclosed within mold cavity 336 in preparation for the pre-form blowing operation, and a just-blown pre-form 308 is supported by the neck bracket assembly 344 for placement on a terminal nose portion 361 of a moveable blow pin assembly 362. Further, a vertically reciprocal blow nozzle 356 has been inserted into the open end of the mold-enclosed parison 306 by a hydraulic cylinder 358.

With the molding assembly positioned as shown in FIG. 10, blow air under pressure is supplied through a longitudinal bore 360 in blow nozzle 356 for expanding the mold-enclosed parison 306 to a pre-form configuration. Substantially simultaneously, hydraulic cylinders 354 are actuated to extend piston rods 352 to raise bracket arms 346 and 348 for inserting the neck portion of pre-form 308 onto the blow pin nose 361, as illustrated in FIG. 11.

Next, hydraulic cylinders 332 and 334 are actuated to open the mold halves 320 and 322, thus leaving the freshly blown pre-form suspended on blow nozzle 356 and pre-form 308 suspended on blow pin assembly 362. Then, hydraulic cylinder 342 retracts piston rod 340 to position mold halves 320 and 322 on each side of parison 304 and neck bracket arms on each side of the freshly blown pre-form on blow nozzle 356. Hydraulic cylinders 332 and 334 are then actuated to close the pre-form mold halves on parison 304, pinching the bottom portion of the tubular parison shut. At the same time, neck support bracket arms 346 moved together, with semi-circular surfaces 350 and 352 closing upon the neck portion of the previously blown pre-form. While the pre-form mold assembly is in this position, the moveable blow pin conveyor system 314 is indexed to advance the blow pins. Then, hydraulic cylinder 358 raises blow nozzle 356, hydraulic cylinders 354 lower the neck bracket assembly, and hydraulic cylinder 342 extends piston rod 340 to position the pre-form mold assembly as shown in FIG. 10.

Figure 12:
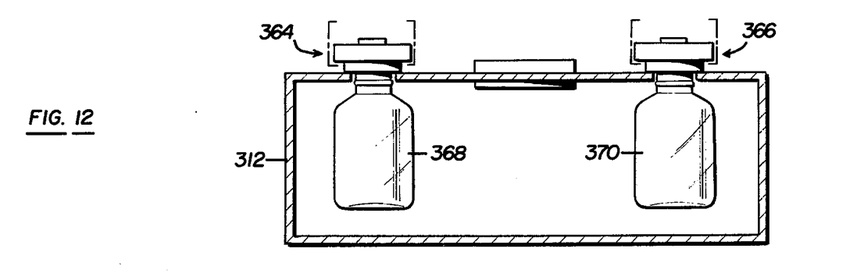
FIG. 12 is a cross-sectional view taken along plane 12—12 as indicated in FIG. 9, illustrating suspended pre-forms in the thermal conditioning chamber.

FIG. 12 simply shows moveable blow pin assemblies 364 and 366 with pendently suspended pre-forms 368 and 370 in thermal conditioning chamber 312. As previously discussed, the temperature of the suspennded pre-forms is adjusted in the thermal conditioning chamber 312 to within the range most conducive to substantial thermal orientation during the final blowing operation.

Figure 13:
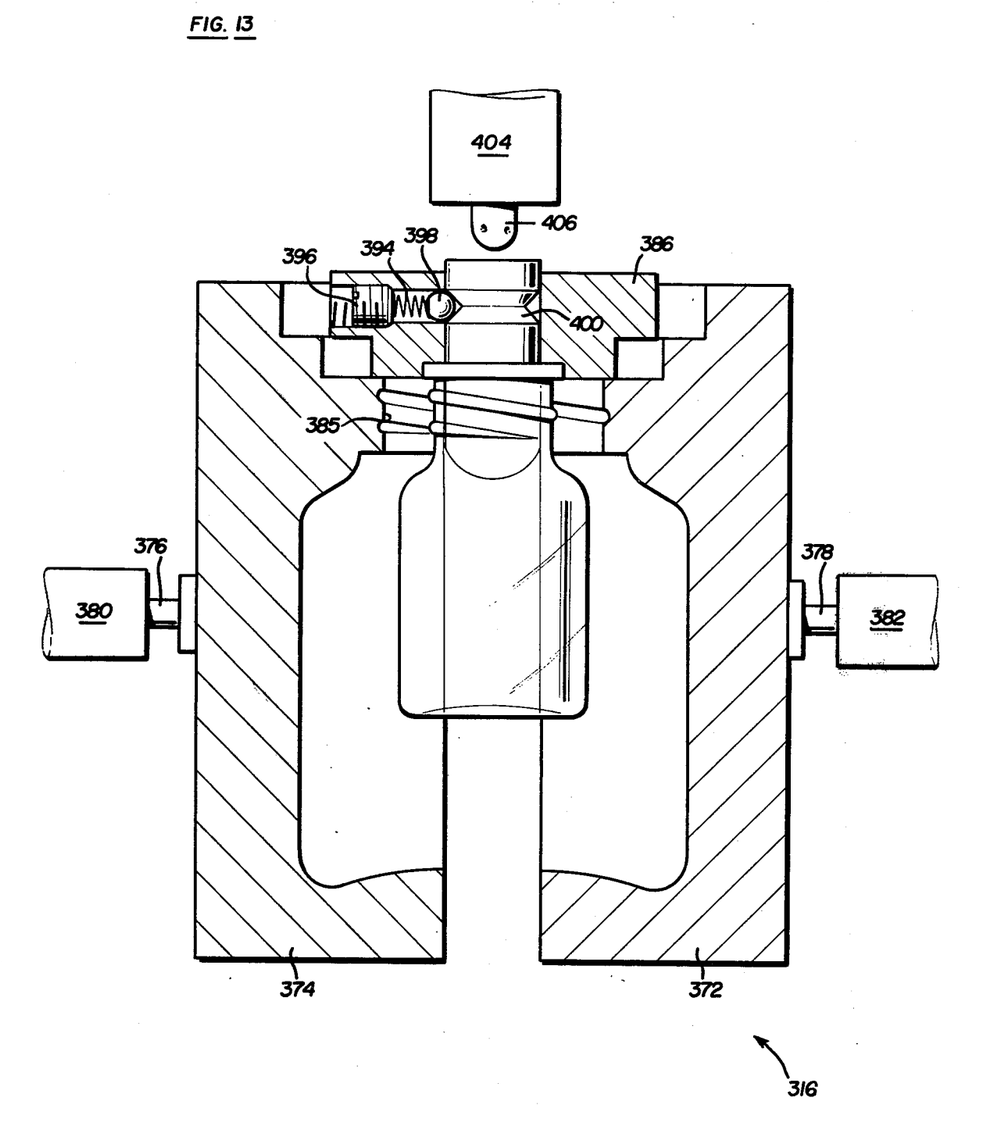
FIG. 13 is a cross-sectional elevation view illustrating an alternative blow pin proposed for use in the embodiment of FIG. 9, as it is positioned at a final blowing station.
Figure 14:
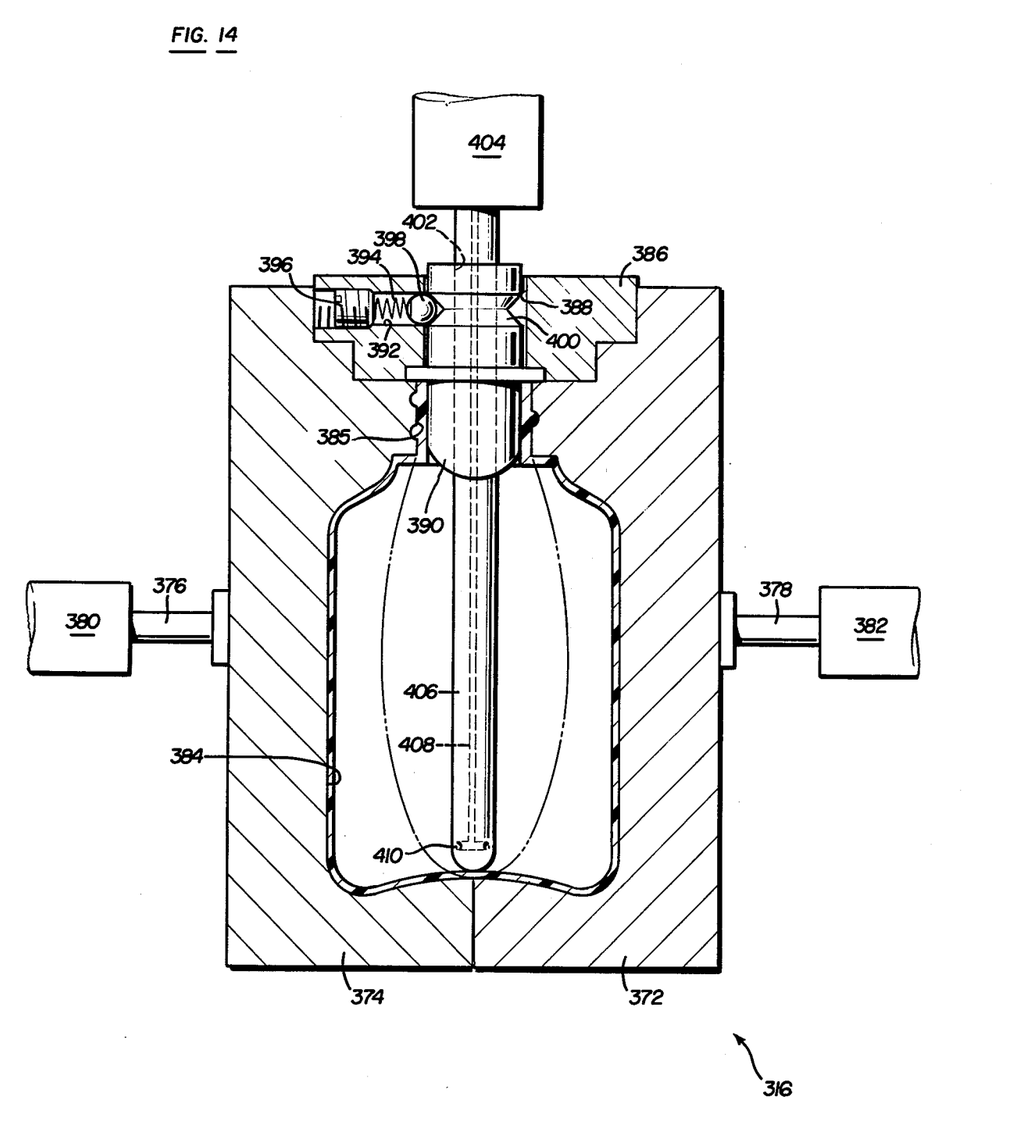
FIG. 14 is a cross-sectional elevation view similar to FIG. 13, illustrating the pre-form in a stretched condition prior to final blowing.
Figures 15, 16:
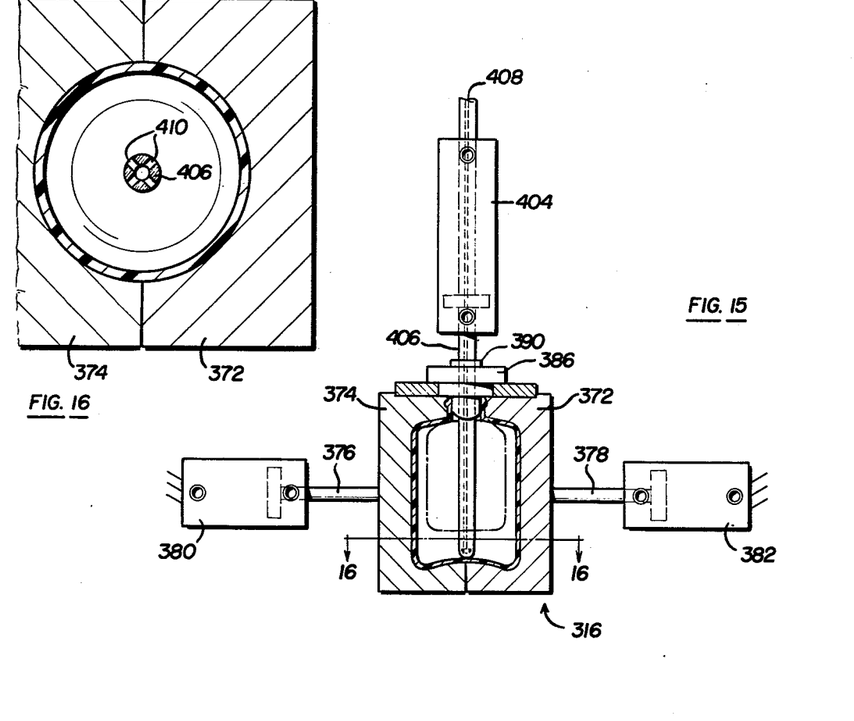
FIG. 15 is a cross-sectional elevation view similar to FIGS. 13 and 14, illustrating the final blown container within the final blow mold.
FIG. 16 is a cross-sectional view taken along plane 16—16 as illustrated in FIG. 15.

As shown in FIGS. 13-15, the final blow mold assembly 316 includes mold halves 372 and 374 which are transversely moveable toward and away from each other by piston rods 376 and 378 of fixed hydraulic cylinders 380 and 382. When closed, the mold halves 372 and 374 define a final blow molding cavity 384 and a finish or neck region 385. It should be noted from FIG. 14 that the pre-form is contacted by the final blow mold halves substantially only at the neck portion prior to the final blowing, thus maintaining the blown pre-form body substantially at the optimum orientation temperature.

The moveable blow pin assemblies of this embodiment include a carrier frame 386 which has a central bore 388. A cylindrical blow pin, or carrier, 390 is maintained within the central bore 388, with a nose portion of the blow pin 390 extending below the carrier frame 386 for insertion within the neck of a blown pre-form.

The carrier frame 386 includes a transverse bore 392 within which a biasing spring 394 is maintained by a threaded plug 396, the spring urging a retention ball 398 into an annular groove 400 of blow pin 390. This arrangement releasably maintains the blow pin 390 in the carrier frame assembly 386 to enable quick ejection of the blow pins or blow pin substitution.

A hydraulic cylinder 404 is positioned above the final blow mold assembly 316 and includes a vertically moveable blow nozzle 406. FIG. 13 illustrates the pendently supported pre-form in position prior to closure of the blow mold halves, with blow nozzle 406 in alignment with the central bore 402 of blow pin 390. FIG. 14 illustrates that blow nozzle 406 may be advanced completely through the blow pin 390 to axially stretch the pre-form to establish an axial orientation of the thermoplastic material. After the stretching operation, air under pressure is injected through the blow pin or carrier 390 into the stretched pre-form by supplying air through an axial bore 408 in the blow nozzle to radial ports 410 for expanding the pre-form to the configuration shown in FIG. 15, thus bi-axially orienting the molecular structure of the thermoplastic material.

Figure 17:
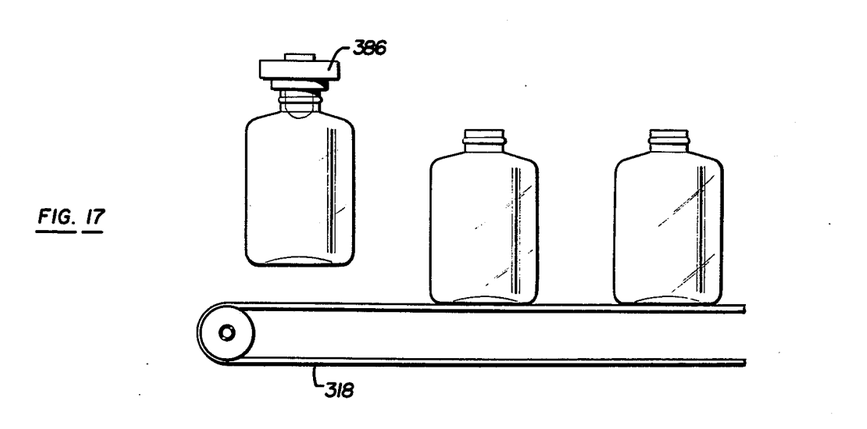
FIG. 17 is a cross-sectional elevational view taken along plane 17—17 as illustrated in FIG. 9.

After the blowing operation hydraulic cylinders 380 and 382 are actuated to retract blow mold halves 372 and 374, leaving the blown article pendently suspended from the terminal nose portion of blow pin 390. The moveable blow pin conveyor system then indexes the moveable blow pin to a position as illustrated in FIG. 17 above a conveyor 318 where the blown article can be ejected in any suitable manner.

The foregoing disclosure, therefore, relates to two primary embodiments for utilizing moveable blow pins for continuously forming molecularly oriented thermoplastic containers. It is to be understood that many facets of the invention which were discussed in regard to one embodiment could be employed equally as well with the other embodiment. For example, the rotation means of FIGS. 7 and 8 may easily be adapted for use with the moveable blow pin conveyor system illustrated in the embodiment of FIG. 9. Further, the pre-form stretching mechanism disclosed in FIGS. 13–15 may likewise be used in conjunction with the final blow mold assembly shown in FIG. 5.

Having therefore completely disclosed our invention, we now claim:

1. In a method of forming a molecularly oriented, plastic article by successively blowing a plastic parison in a first mold cavity to a pre-form having a blown body and a generally annular opening and then blowing the pre-form while at a temperature conducive to molecular orientation in a second mold cavity to the configuration of the final article, the improvement comprising the steps of transporting the pre-form from the first mold cavity to a position where the annular opening is in vertical alignment with a laterally movable, essentially cylindrical carrier, vertically raising the pre-form to telescopically insert the carrier in the annular pre-form opening, adjusting the temperature of the pre-form in an elongated thermal conditioning chamber to within the range for substantial molecular orientation while (a) the pre-form is pendently suspended from said carrier and (b) the pre-form is incrementally displaced by the carrier into and through the elongated conditioning chamber, displacing the carrier with the suspended pre-form from the thermal conditioning chamber to the second mold cavity while the pre-form temperature is accurately maintained within the desired range for the final blowing operation; injecting blow fluid under pressure through the carrier and into the pre-form to form the final article; and maintaining the carrier at essentially the same horizontal level while displacing the pre-form through the thermal conditioning chamber and to the second mold cavity.

2. In a method of forming a blown thermoplastic article, the steps of extruding a tubular thermoplastic parison at an extrusion station; closing the sections of a pre-form mold on the parison at the extrusion station to pinch one end of the parison shut and to enclose the parison within a pre-form cavity defined by the closed pre-form mold sections; severing the tubular parison to form an open-ended portion thereof; displacing the pre-form mold from the extrusion station to a pre-form molding station and aligning the open end of the mold-enclosed parison with a vertically displaceable blow nozzle; inserting the blow nozzle into the open end of the parison and blowing the parison internally of the pre-form mold to a pre-form configuration having a blown body portion surmounted by a generally annular neck; opening the sections of the pre-form mold and pendently retaining the blown pre-form on the blow nozzle; gripping an external portion of the pre-form and then withdrawing the blow nozzle therefrom; laterally displacing the pre-form to a position where the neck is in vertical alignment with a laterally moveable blow pin; vertically raising the pre-form and telescopically assembling the pre-form on the moveable blow pin, so that the pre-form is pendently supported therefrom; incrementally displacing the blow pin laterally through an elongated thermal conditioning chamber; adjusting the temperature of the blown pre-form in the thermal conditioning chamber to within the molecular orientation temperature range, while the pre-form is suspended from the moveable blow pin; interposing the thermally conditioned, pendently supported pre-form and the blow pin between the sections of a final blow mold at a final mold station; closing the final mold sections to enclose the thermally conditioned pre-form within a final mold cavity having the configuration of the blown thermoplastic article; expanding the pre-form while at a temperature conducive to molecular orientation to the configuration of the final mold cavity; removing the blown article from the sections of the final mold and from the blow pin; laterally transporting the blow pin to a position in alignment with a subsequentially formed blown pre-form and maintaining the blow pin at the same horizontal level during its movement.

* * * * *